United States Patent
Shal et al.

(10) Patent No.: US 6,668,222 B2
(45) Date of Patent: Dec. 23, 2003

(54) VEHICLE SUSPENSION CONTROL HAVING ELECTRONIC BUMPSTOP WITH TRIMSET COMPENSATION

(75) Inventors: David Andrew Shal, Bellbrook, OH (US); Timothy John Juuhl, Clarkston, MI (US); Khaled M. Jundi, Dayton, OH (US); Steven Paul Sammut, Holly, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/102,196

(22) Filed: Mar. 19, 2002

(65) Prior Publication Data

US 2003/0182036 A1 Sep. 25, 2003

(51) Int. Cl.$^7$ .............................................. B60G 17/00
(52) U.S. Cl. ...................................................... 701/37
(58) Field of Search ....................... 701/36–38; 280/5.5, 280/5.507, 5.512–5.515; 702/104, 105; 73/1.79

(56) References Cited

U.S. PATENT DOCUMENTS

| | | | | |
|---|---|---|---|---|
| 4,975,849 A | * | 12/1990 | Ema | 701/37 |
| 5,031,934 A | | 7/1991 | Soltis | 280/840 |
| 5,282,645 A | | 2/1994 | Spakowski et al. | 280/707 |
| 5,461,564 A | | 10/1995 | Collins et al. | 364/424.05 |
| 5,510,988 A | | 4/1996 | Majeed et al. | 364/424.05 |
| 5,539,639 A | * | 7/1996 | Devaud et al. | 701/37 |
| 5,570,288 A | | 10/1996 | Badenoch et al. | 364/424.05 |
| 5,964,455 A | | 10/1999 | Catanzarite et al. | 267/131 |
| 6,097,999 A | | 8/2000 | Shal et al. | 701/38 |
| 6,181,997 B1 | | 1/2001 | Badenoch et al. | 701/37 |
| 6,219,602 B1 | | 4/2001 | Badenoch et al. | 701/37 |
| 6,260,675 B1 | | 7/2001 | Muhlenkamp | 188/267 |

OTHER PUBLICATIONS

Nehl et al "An Integrated Relative Velocity Sensor For Rea Time Damping Applications" Conference Record of the 1995 IEEE, vol. 1, 8–12, Oct. 1995.*

* cited by examiner

Primary Examiner—Thu Nguyen
(74) Attorney, Agent, or Firm—Robert M. Sigler

(57) ABSTRACT

A suspension control for vehicle dampers uses a trimset value to compensate signals from relative body/wheel position sensors associated with the dampers. Each trimset value is determined by recording a sensor value with the body and wheel in a predetermined relative state, such as by lifting the vehicle until the associated wheel is free of the ground and hanging in a low limit position determined by the suspension apparatus. In vehicle operation, the trimset value is used as an offset to the relative position sensor signal to accurately determine damper position relative to its compression and rebound limit positions. When the damper is within a predetermined bump stop region near either of the compression and rebound limit positions, a bump stop value is determined and applied to the damper to provide a high minimum damping level creating an electronic bump stop for the damper.

19 Claims, 4 Drawing Sheets

VEHICLE SUSPENSION CONTROL HAVING ELECTRONIC BUMPSTOP WITH TRIMSET COMPENSATION

TECHNICAL FIELD

The technical field of the invention is a vehicle suspension control.

BACKGROUND OF THE INVENTION

Many vehicles are provided with controlled suspensions in which dampers provide controlled damping of relative vertical body/wheel motion for vehicle wheels. The damping force of each controlled damper is determined by an electronic control signal provided by a controller derived from vehicle dynamic variables, typically including a signal from a relative body/wheel position sensor. Most of these dampers are provided with at least one bump stop device to cushion the damper when it is driven to its compression or extension limit; and it has been suggested that the damper controller can provide an electronically determined bump stop force by increasing damping force when the damper nears one of the compression and extension limit positions, as determined by the signal from the relative body/wheel position sensor. But build variations from vehicle to vehicle and from wheel to wheel may cause an offset between the position indicated by the sensor and the actual position of the damper relative to its compression and extension limits. This offset is generally irrelevant to the main control algorithm of the suspension controller, since the relative positions are typically only differentiated to obtain relative body/wheel velocities, with the offset disappearing in the differentiation. But incorporation of a bump stop algorithm in affordable, mass produced vehicles requires accurate relative body/wheel position relative to the damper compression and extension limits and thus typically requires the addition of a trimset compensation for each wheel to reference the output of the sensor to the compression and extension limit positions of the damper. A physical trimset adjustment is too costly to be practical in mass production.

SUMMARY OF THE INVENTION

This invention provides an accurate trimset of the relative body/wheel position sensor to the associated damper by receiving the sensor output with the body and wheel in a predetermined relative state and storing the received value as a reference or trimset value for use as an offset in deriving a damper position value from the relative position signal for each wheel. The damper position value is then used in a bump stop algorithm to accurately apply an increase in damping when the damper position is within a predetermined range of at least one of compression and rebound limit positions of the damper. Preferably, a scaled reduction in the increase of damping is provided as the damper position signal moves away from the compression or rebound limit position giving rise to the increase. In a preferred predetermined relative state of the body and wheel, the wheel is supported solely by the body through the suspension apparatus; and this state may be achieved for all the wheels of the vehicle by lifting the vehicle, for example on a hoist, until all wheels are off the ground. In an alternative relative state of the body and wheel, the body is supported by the wheel in the normal manner, although this embodiment is less preferred due to possible variations in body loading, especially in service trimset operations, that may affect the accuracy of the trimset value. In service trimset operations, the relative position value may be modified by a service offset value in deriving and/or storing the trimset value.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
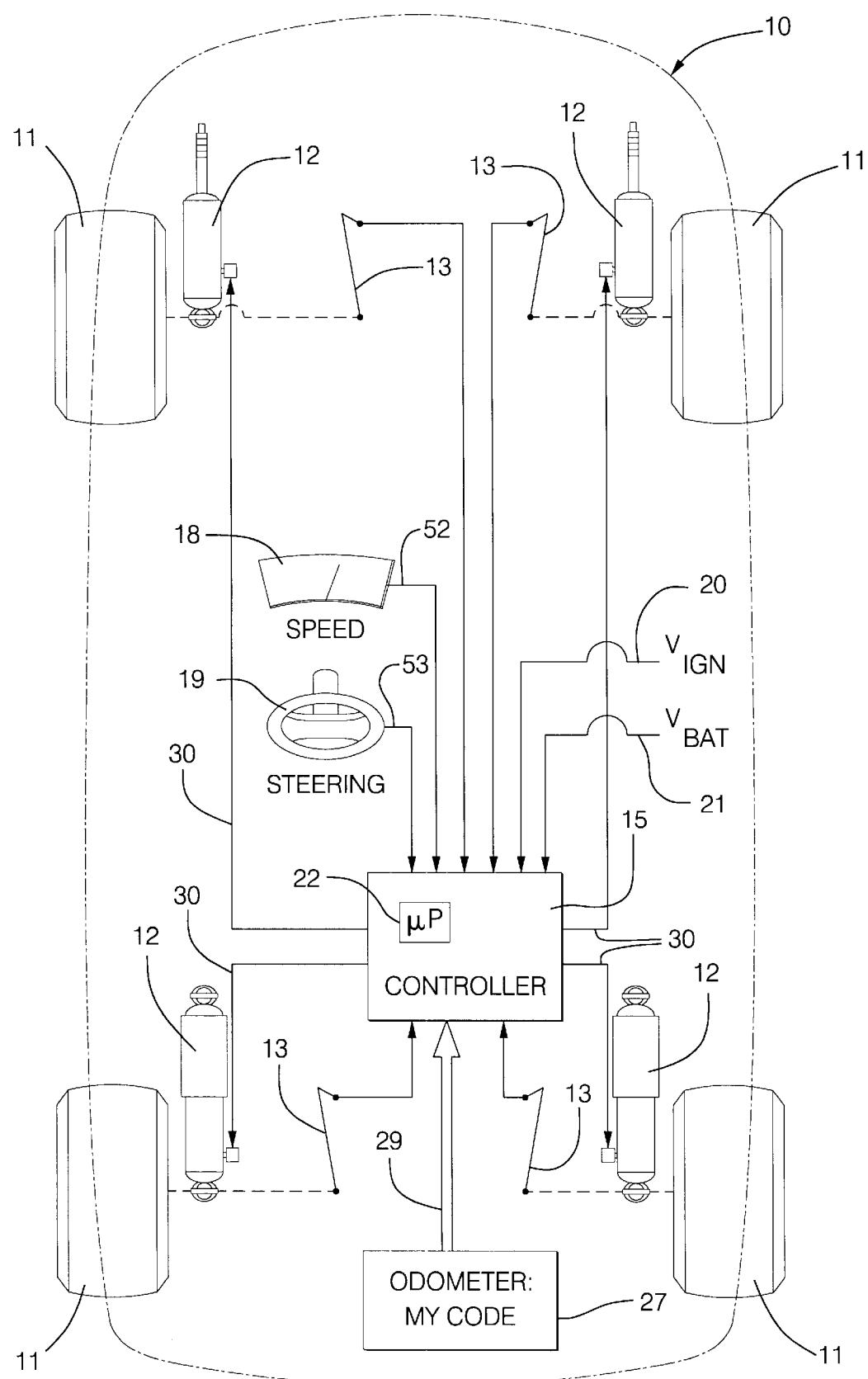
FIG. 1 is a block and schematic diagram of a vehicle having a suspension control according to this invention.

Referring to FIG. 1, an example apparatus implementing this invention comprises a vehicle body 10 supported on four wheels 11 by four suspensions including springs of a known type (not shown). Each suspension includes a variable-force, real time, controllable damper 12 connected to exert a vertical force between wheel 11 and body 10 at that suspension point. Although many such suspension arrangements are known and appropriate to this invention, actuator 12 of the preferred embodiment comprises an electrically controllable, variable force damper in parallel with a weight bearing coil spring in a parallel spring/shock absorber or McPherson strut arrangement. A preferred damper for use as actuator 12 is a continuously variable damper responsive to an electronic control signal to vary its damping force/velocity characteristic in real time. Typically, such a damper has an electromagnetic actuating apparatus in which an external control varies the current in a coil, to control an electrically controlled valve such as damper described in U.S. Pat. No. 5,282,645 or to vary the magnetic field through a magnetorheological fluid such as the damper shown in U.S. Pat. No. 6,260,675. This embodiment is described in terms of standard pulse width modulation (PWM) commands but also includes closed loop current control commands or any other electric current control technology. In addition, many other damper configurations are possible within the scope of this invention, as long as the damping force is variable in real time in response to an electrical control signal; and the commands will be appropriate to the technology.

Each corner of the vehicle includes a relative position sensor 13 that provides an output signal indicative of the relative vertical distance between the vehicle wheel and the suspended vehicle body at that corner of the vehicle. An example relative position sensor 13 includes a resistive device mounted to the vehicle body and a link pivotally coupled between the vehicle wheel and a pivot arm on the resistive device such that the resistive device provides an impedance output that varies with the relative vertical position between wheel 11 and the corner of body 10. Each relative position sensor 13 may further include an internal circuit board with a buffer circuit for buffering the output signal of the resistive device and providing the buffered signal to a suspension controller 15. Suitable relative position sensors 13 of this are known to, or can be constructed by, those skilled in the art. Any alternative type of position sensor, including transformer type sensors, may be used as relative position sensors 13.

The outputs of relative position sensors 13 are provided to a suspension controller 15 which may process the signals, for example as described in one or more of U.S. Pat. No. 5,606,503, U.S. Pat. Nos. 5,570,288, 6,097,997, U.S. Pat. No. 6,181,997 and U.S. Pat. No. 6,219,602, to determine the states of vehicle body 10 and wheels 11 and generates an output actuator control signal for each variable actuator 12. To accomplish this processing, controller 15 is provided with a microcomputer 22 having a CPU, volatile and non-volatile memory and input/output apparatus in the standard manner. Algorithms are stored in non-volatile memory in the form of program code to determine, in response to signals including relative position signals from sensors 13, Corner Damping Commands for the dampers at each corner of the vehicle. Suspension controller 15 outputs these signals expressing these damping commands through suitable output apparatus including lines 30 to control actuators 12 in real time. Other signals that suspension controller 15 may use include a vehicle speed signal from a sensor 18 on line 52, a steering wheel angular position from a sensor 19 on line 53 and a trimset record signal on line 54. Obtaining such signals may be achieved through the use of known types of sensors or vehicle control signals available to those skilled in the art. Ignition voltage $V_{IGN}$ and battery voltage $V_{BAT}$ are typically also provided to suspension controller 15 on lines 20 and 21, respectively. In addition, the odometer value and/or model year code, if electronically stored as shown at 27, may be provided to suspension controller 15 on a serial communication bus 29.

Figure 2:
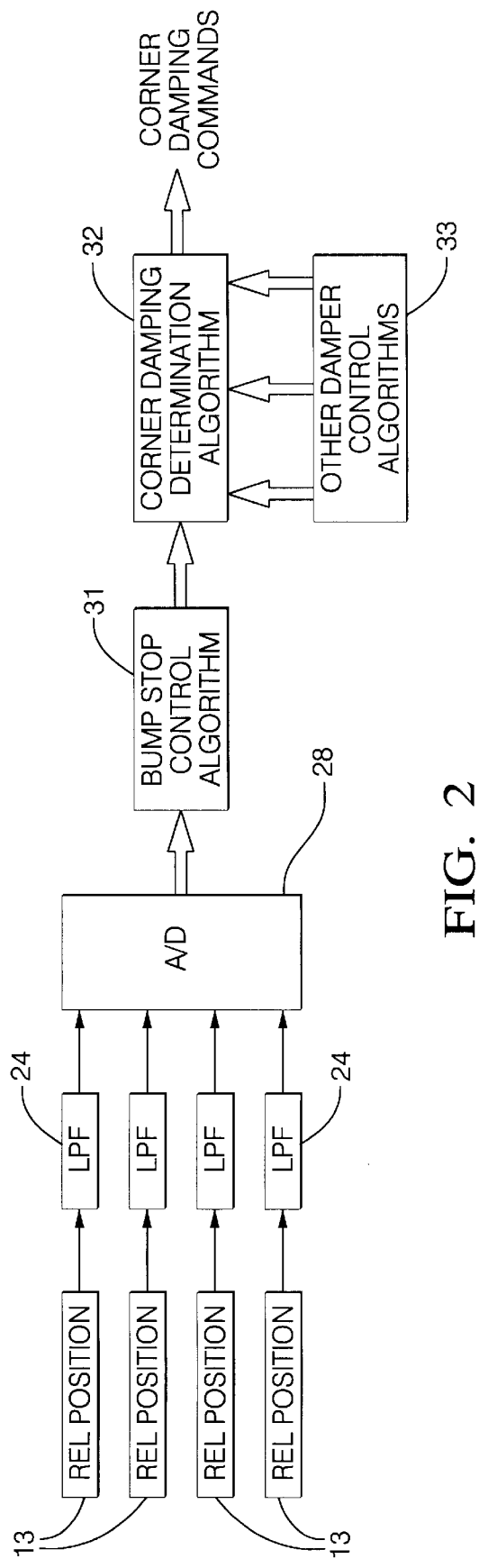
FIG. 2 is a block diagram of a portion of a suspension control providing a bump stop damping force in accordance with this invention.

FIG. 2 is a block diagram of the bump stop control of this invention. The signals from relative position sensors 13 are each filtered in a low pass filter 24 for noise reduction and processed through an analog to digital (A/D) converter 28. It should be noted that the previously cited patents such as U.S. Pat. No. 6,219,602 show the outputs of filters 24 differentiated before being passed to A/D converter 28, since relative velocity signals are required for the main (body and wheel) suspension control algorithms. In a combined system, both the outputs of the low pass filters 28 and the outputs of the differentiators will thus be provided to A/D converter 28, so that both relative velocity signals and relative position signals will be available in the controller 15.

Figure 3:
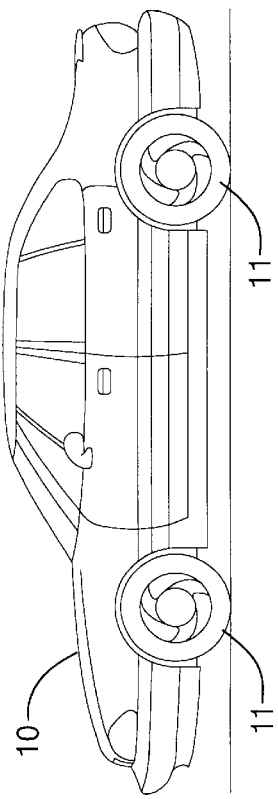
FIG. 3 shows a vehicle with a body supported on its wheels.

The filtered relative position signals are provided to the Bump Stop Control Algorithm 31, along with the trimset record signal and the high pass filtered relative velocity signals derived from the relative velocity signals as, for example, in block 26 in FIG. 3 of the aforementioned U.S. Pat. No. 6,219,602, the latter signals being used to show the direction of movement of the dampers (compression or rebound). The Bump Stop Control Algorithm determines and outputs a bump stop damping value for each corner (wheel) of the vehicle, which value is an indication (and a command if selected) of the current level to be applied to the coil in the damper force controlling mechanism of the damper. The bump stop damping values are provided to a Corner Damping Determination Algorithm 32 that combines these values in a predetermined manner with corresponding damping values from other Damper Control Algorithms 33 to provide the Corner Damping Commands that are applied to the dampers at the four corners of vehicle 10. Of course, the three defined algorithm blocks 31, 32 and 33 are all located within and performed by the controller 15.

The Bump Stop Control Algorithm has two, mutually exclusive, modes of operation. The first is a trimset determination mode in which trimset values for the dampers are determined from the relative position sensor outputs and stored body and wheel in a predetermined relative state. A preferred such predetermined relative state is defined as the body providing sole support for the wheels through the suspension apparatus, as when the vehicle is lifted so that the wheels are free of the ground. The second mode of operation is the bump stop control mode, active during vehicle operation, in which the dampers of the vehicle are provided with electronic bump stop control using the trimset values stored in the trimset determination mode to compensate the relative position signals from the sensors 13 and thus numerically specify the sensed state of the damper relative to its compression and rebound limits.

Figure 4:
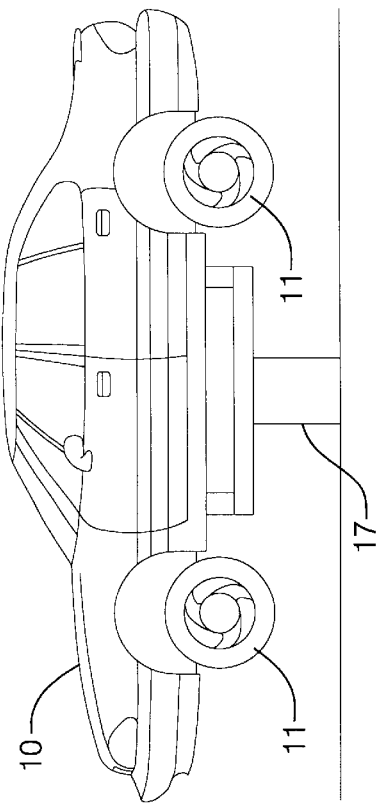
FIG. 4 shows a vehicle raised so that its wheels are supported by its body.
Figure 7:
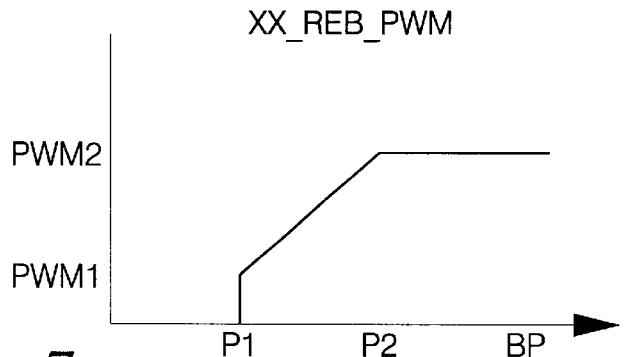
FIGS. 7 and 8 are graphs showing a desired bump stop damping value as function of damper position relative to rebound and compression limit positions, respectively.
Figure 8:
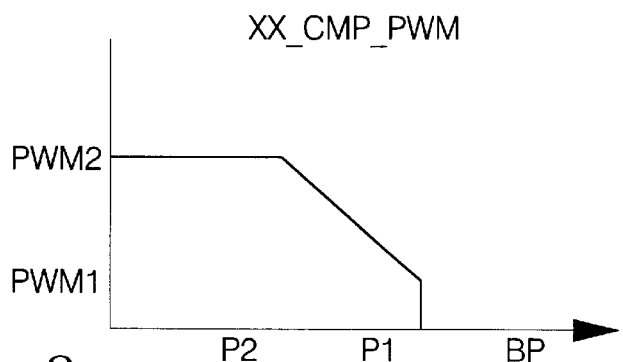

The trimset determination mode is described with reference to FIGS. 3 and 4, as well as the flow chart of FIG. 5. FIG. 3 shows vehicle 10 supported by its wheels 11 on the ground. This defines a predetermined relative state of the wheels and body in which the body is supported solely by the wheels and each wheel supports the body. If the vehicle is put on a hoist 17 or otherwise raised until each of its wheels 11 are freed from the ground, as shown in FIG. 4, an alternative relative state of the wheels and body is defined in which each wheel is supported solely by the body. in a lower limit or droop position determined by the suspension apparatus at each wheel. The latter predetermined relative state, in which the body supports the wheels, is preferred for trimset operations, as described at a later point with reference to FIGS. 6–8.

Figure 5:
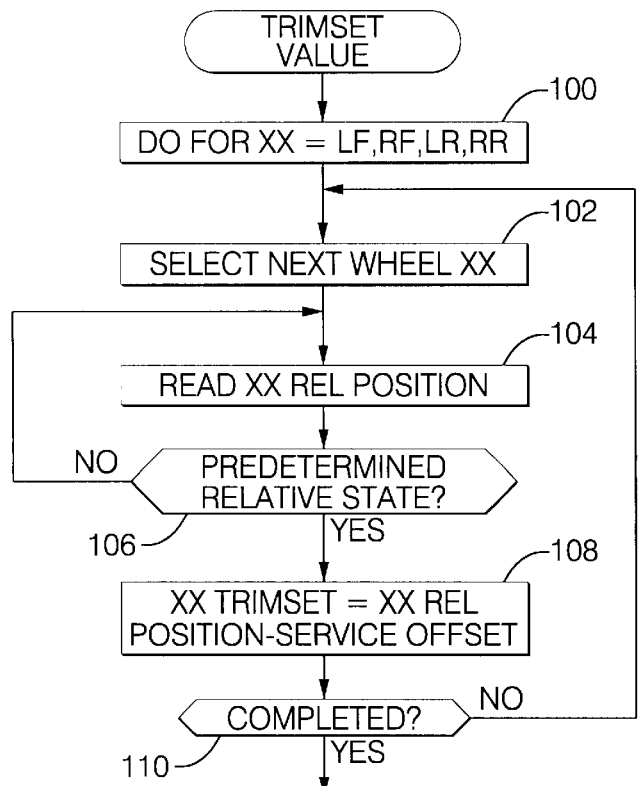
FIGS. 5 and 6 are flow charts illustrating the operation of the suspension control of FIG. 2.

FIG. 5 shows the subroutine TRIMSET VALUE, which is activated by a qualified trimset operator (vehicle assembler or servicer) selecting the trimset mode for suspension controller 15. The subroutine contains a DO loop called at step 100 to determine trimset values for all four dampers 12 of vehicle 10: XX=LF (left front), RF (right front), LR (left rear), RR (right rear). At step 102 the next corner or wheel XX is selected. At step 104, the relative position value from the sensor 13 for the selected wheel XX is read. At step 106 the subroutine determines if the predetermined relative state of the body and wheel has been achieved: in the preferred embodiment this is defined as when the lower limit or droop position for the selected wheel XX has been achieved. This may be accomplished most directly if the trimset operator, having observed that all four wheels are clear of the ground and are not moving vertically relative to the vehicle body, signals controller 15 to record the trimset values for all four wheels. In a vehicle service situation this would be the preferred manner; but in an assembly plant, the signal could be generated in a more automated manner if desired. The signal itself may preferably be provided over a serial communication bus of the type that is becoming standard on most vehicles. If the predetermined relative state is not found at step 106, the subroutine returns to step 104 to repeat steps 104 and 106. But if the predetermined relative state is indicated at step 106 the subroutine determines the trimset value for that wheel at step 108:

*XX* Trimset=*XX* Relative Position−Service Offset.

The Service Offset Value will be explained in more detail at a later point in this description; in the initial trimset operation during vehicle assembly, its value is generally zero. From step 108, the subroutine determines at step 110 if all trimset values have been determined. If not, the subroutine returns to step 102 to select the next wheel XX; but, if all trimset values have been recorded, the subroutine exits.

Figure 6:
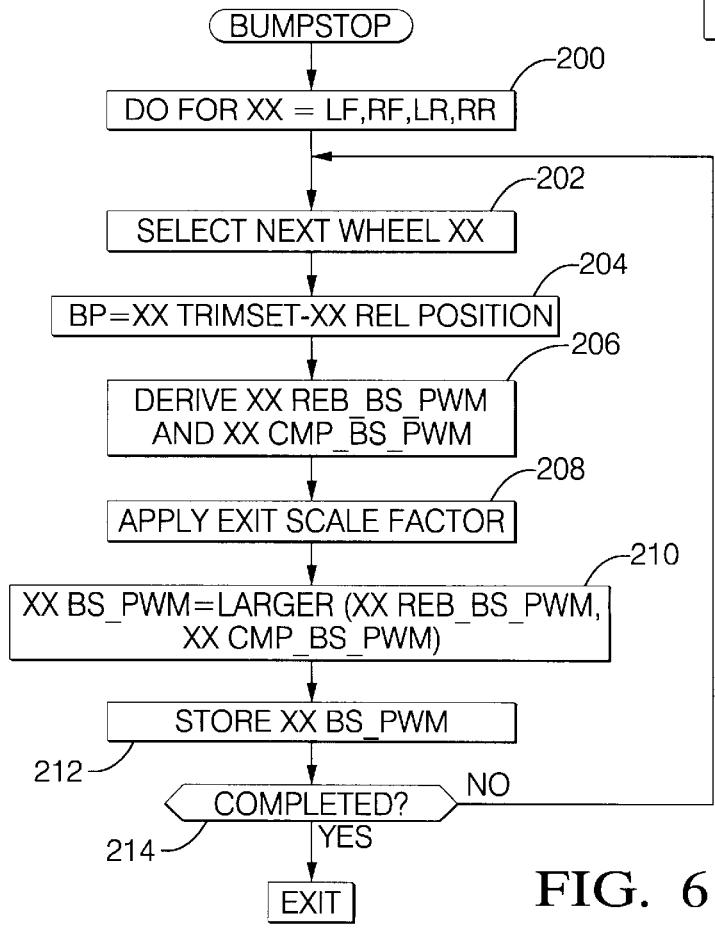

The bump stop control mode is described with reference to FIG. 6, which shows a subroutine BUMPSTOP that runs during vehicle operation. It begins at step 200 with the calling of a Do loop, with the steps of the loop performed for each wheel 11 of vehicle 10: XX=LF (left front), RF (right front), LR (left rear), RR (right rear). At step 202, the next wheel is selected. At step 204, the relative position value for wheel XX is trimset compensated by the corresponding stored value of Trimset. The compensated value BP is given by the following equation:

$$BP = XX\ \text{Trimset} - XX\ \text{Rel Position}.$$

The value BP is thus accurate with reference to the compression and rebound limit values of the damper associated with the wheel.

The next four steps in the loop determine the appropriate bump stop damping value for the damper. At step 206 the value of BP is used to enter a lookup table for rebound (FIG. 7) to determine the value of XX REB_BS_PWM and a lookup table for compression (FIG. 8) to determine the value of XX CMP_BS_PWM. The "entry" reference values P1 and P2 for the tables define the range of application of bumpstop damping at the compression and rebound limits of damper movement, referenced to the damper compression and rebound limit positions. They are determined in advance by design and/or experimentation for a particular vehicle model for the vehicle state in which the trimset value is determined: for example the "droop" position as described above. The droop position method is preferred due to the fact that the accuracy of the stored reference values P1 and P2 depends upon the repeatability of the body and wheel assuming a predetermined relative position when they are put in the predetermined relative state. This position will vary from wheel to wheel and from vehicle to vehicle within a vehicle model due to production variations in vehicle structural parameters such as body mass, unsprung (wheel, etc) mass, suspension spring rate, etc. It has been found that this variation is smaller when the body supports the wheels than it is when the wheels support the body. It should be noted that, in the graphs of FIGS. 7 and 8, the vertical axis is not intended to specifically signify a numerical division between positive and negative values. For example, with the sign conventions used, wherein the sign of BP is chosen to provide more positive values closer to the rebound limit position, the values of P1 and P2 in FIG. 8 will both be negative (with P2 being more negative than P1). The value of P2 in FIG. 7 will be more positive, or less negative, than the value of P1.

The values stored in the table ensure that either table output will have a non-zero value only when the damper is close to the appropriate (that is, rebound or compression) damper limit position; and the damper cannot physically be in such close proximity to both compression and damper positions simultaneously. Next, at step 208, an exit scale factor is applied to either of the values XX REB_BS_PWM and XX CMP_BS_PWM if the damper is exiting the bump stop region rather than entering it. The scale factor ensures that the high bump stop damping is reduced smoothly and gradually rather than in a big step when the region is exited. The direction of damper movement is determined as the sign of the high pass filtered relative velocity of the damper. If the direction is that of rebound, then a compression exit scale factor is applied to XX CMP_BS_PWM, the bump stop damping value applied near the compression limit position:

$$XX\ CMP\_BS\_PWM = XX\ CMP\_BS\_PWM * CMP\_EXIT\_SF.$$

Alternatively, if the direction is that of compression, than the exit scale factor is applied to XX REB_BS_PWM, the bump stop damping value applied near the rebound limit position:

$$XX\ REB\_BS\_PWM = XX\ REB\_BS\_PWM * REB\_EXIT\_SF.$$

In the next step 210, the appropriate one of the compression and rebound damping values is chosen. The preferred method is to pick the value that is greater in magnitude. Because of the constraints described above, only a value in one of the bump stop regions can be greater than zero, whether or not reduced by the exit scale factor; and the damper cannot be in both the compression and rebound bump stop regions simultaneously. Thus, if one is greater in magnitude than the other, it must be the desired non-zero value; and it is stored as XX BS_PWM at step 212. If neither is greater (that is, both are zero), than the value zero is chosen and stored. From the next step 214 the subroutine is returned to step 202 to select a wheel XX for the next loop unless all four loops have been completed, in which case the subroutine is exited with appropriate bump stop damping values BS_PWM for each of the wheels stored in memory.

Figure 9:
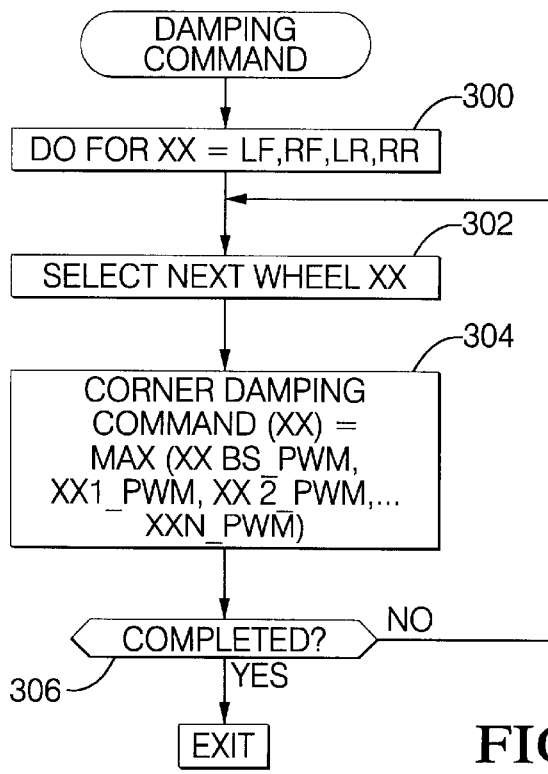
FIG. 9 is a flow chart illustrating the operation of the suspension control of FIG. 2.

Referring again to FIG. 2, the values of BS_PWM are provided by Bump Stop Control Algorithm 31 to Corner Damping Determination Algorithm 32, wherein they are combined with damping values from any Other Damper Control Algorithms 33 to determine the total Corner Damping Command for each wheel. The other damping control algorithms will generally comprise a main suspension control algorithm providing damping control values for each wheel derived from body modal heave, roll and pitch velocities and damping control values for each wheel derived from vertical wheel motions. The other damping control algorithms may also provide such additional damping control values for each wheel as a transient turning maneuver damping value as described in U.S. Pat. No. 6,097,999, an active brake control damping value as described in U.S. Pat. No. 6,181,997, a stability in turn damping value as described in U.S. Pat. No. 6,219,602, or even a simple stored minimum damping value as shown in U.S. Pat. No. 5,570,288. But, no matter how many or what damping values are to be combined, the preferred method of combination is to select the value greatest in magnitude for each wheel, as described in each of the patents referenced in this paragraph. This method is performed in subroutine DAMPING COMMAND, which is shown in flow chart form in FIG. 9. The DO loop is called at step 300 to apply the method to each of the wheels LF, RF, LR, RR. At step 302, the next wheel XX is selected. At step 304, the Corner Damping Command is determined for the selected wheel XX as the greatest in magnitude of XX BS_PWM and all other damping values XX 1_PWM, XX 2_PWM, ... XX N_PWM, where XX ranges from 1 to N. From the next step 306, the subroutine returns to step 302 to select the next wheel or, if Corner Damper Commands for all wheels have been generated, the subroutine exits.

The Corner Damping Commands are then output to the dampers as previously described to control the coil current in the damping force generating apparatus of each damper. The damping in each damper is controlled by the greatest of the damping values determined in the various damping control algorithms included in controller 15. The Bump Stop Algorithm will provide a non-zero damping value only when the damper is in a bump stop region near one of the compression rebound limit positions; and the accuracy of the damping value will be maximized by the trimset value determined in accordance with this invention.

The trimset recording operation previously described with reference to FIG. 5 is performed at the time of vehicle assembly; but it may need to be repeated during the life of the vehicle. For example, if a controller needs to be replaced, the stored trimset values will be lost as the old controller is removed. Additionally, a replacement suspension sensor may require a new trimset. But the accuracy of the trimset process depends in part on an accurate prediction of the vertical distance between the body and wheel in their predetermined relative state; and the predetermined relative state may not be attainable with the same degree of accuracy at a later point in the life of the vehicle as it is during the controlled conditions of vehicle assembly. For example, vehicle loading (fuel in the fuel tank, loads in the trunk or passenger compartment, presence or lack of spare tire, service person sitting in the vehicle, etc.) may vary; and this may significantly affect the predetermined relative state of the vehicle body supported on the wheels. Although the preferred relative state of the wheels supported solely by the body (body hoisted until the wheels are off the ground) is not affected by body loading, it may be affected by unsprung mass loading (tire substitution, etc.). In addition, vehicle suspension components or their connection to each other may change with age (springs weakening, wear, etc.) so that the wheels hang at a different height.

Although such changes do not adversely affect the bump stop algorithm as long as the original trimset values are retained, they will, if present, affect new trimset values and may thus degrade the accuracy of the damper position signals that are derived from the sensor signals. This is why a Service Offset value is included in step 108 of FIG. 5 to compensate for predictable changes in the predetermined relative state of the body and wheel. The value of Service Offset is calculated on the basis of expected suspension apparatus changes and is preferably a function of vehicle mileage and/or vehicle age. Preferably, the service offset addition is automated as much as possible to avoid errors by service personnel. For example, if the vehicle odometer and/or model year code information is available within the vehicle, the service offset value may be derived by the trimset offset routine transparently to the service operator.

What is claimed is:

1. A suspension control for a vehicle having a body, a wheel and suspension apparatus supporting the body on the wheel and limiting vertical downward movement of the wheel relative to the body when the vehicle body is lifted from the ground, the suspension apparatus further having a damper providing damping of vertical movement of the wheel relative to the body between compression and rebound limit positions, the damper having apparatus providing damping force responsive to an electronic control signal, the control comprising:

means for receiving a relative position signal indicating the relative position of the wheel to the body;

means for storing a trimset value of the relative position signal with the body and wheel in a predetermined relative state;

means for deriving a damper position signal from the relative position signal and the trimset value;

means for storing a reference limit value having a predetermined relationship to one of the compression and rebound limit positions with the body and wheel in the predetermined relative state;

means for generating the electronic control signal in response to vehicle dynamic variables and modifying the electronic control signal to increase damping when the damper position signal is within a predetermined range of the one of the compression and rebound limit positions as determined by a comparison of the damper position signal and the stored reference limit value; and means for outputting the electronic control signal.

2. A suspension control according to claim 1 wherein the predetermined relative state of the body and wheel comprises the body providing sole support for the wheel through the suspension apparatus.

3. A suspension control according to claim 1 wherein the predetermined relative state of the body and wheel comprises the wheel providing support for the body through the suspension apparatus.

4. A suspension control according to claim 1 wherein the damper position signal is derived from the relative position signal with the trimset value providing an offset.

5. A suspension control according to claim 1 wherein the means for generating the electronic control signal provides a scaled reduction in the increase of damping as the damper position signal moves away from the predetermined one of the compression and rebound limit positions.

6. A suspension control according to claim 1 wherein the means for storing a trimset value derives the trimset value at least partly in response to a stored value indicating accumulated vehicle mileage.

7. A suspension control according to claim 1 wherein the means for storing a trimset value derives the trimset value at least partly in response to a stored value indicating vehicle age.

8. A suspension control for a vehicle having a body, wheels and suspension apparatus supporting the body on the wheels and limiting vertical downward movement of each wheel relative to the body when the vehicle body is lifted from the ground, the suspension apparatus further having dampers providing damping of vertical movement of the wheels relative to the body between compression and rebound limit positions, the dampers having apparatus providing damping force responsive to an electronic control signal, the control comprising:

a sensor for each wheel providing a relative position signal indicating the relative position of the wheel to the body;

means for storing a trimset value of the relative position signal with the body and wheel in a predetermined relative state;

means for deriving a damper position signal from the relative position signal and the trimset value;

means for storing a reference limit value having a predetermined relationship to one of the compression and rebound limit positions with the body and wheel in the predetermined relative state;

means for generating the electronic control signal in response to vehicle dynamic variables and modifying the electronic control signal to increase damping when the damper position signal is within a predetermined range of the one of the compression and rebound limit positions as determined by a comparison of the damper position signal and the stored reference limit value; and means for providing the electronic control signal to the damper.

9. A suspension control according to claim 8 wherein the predetermined relative state of the body and wheel comprises the body providing sole support for the wheel through the suspension apparatus.

10. A suspension control according to claim 8 wherein the predetermined relative state of the body and wheel comprises the wheel providing support for the body through the suspension apparatus.

11. A suspension control according to claim 8 wherein the damper position signal is derived from the relative position signal with the trimset value providing an offset.

12. A suspension control according to claim 8 wherein the means for generating the electronic control signal provides a scaled reduction in the increase of damping as the damper position signal moves away from the predetermined one of the compression and rebound limit positions.

13. A method of controlling a suspension damper for a vehicle having a body, a wheel and suspension apparatus supporting the body on the wheel and limiting vertical downward movement of the wheel relative to the body when the vehicle body is lifted from the ground, the damper providing damping of vertical movement of the wheel relative to the body between compression and rebound limit positions of the damper, the damper having apparatus providing damping force responsive to an electronic control signal, the method comprising the steps:

receiving a relative position signal indicating the relative position of the wheel to the body;

storing a trimset value of the relative position signal with the body and wheel in a predetermined relative state;

deriving a damper position signal from the relative position signal and the trimset value;

storing a reference limit value having a predetermined relationship to one of the compression and rebound limit positions with the body and wheel in the predetermined relative state;

generating the electronic control signal in response to vehicle dynamic variables and modifying the electronic control signal to increase damping when the damper position signal is within a predetermined range of the one of the compression and rebound limit positions as determined by a comparison of the damper position signal and the stored reference limit value; and outputting the electronic control signal.

14. The method of claim 13 wherein the predetermined relative state of the body and wheel comprises the body providing sole support for the wheel through the suspension apparatus.

15. The method of claim 13 for a vehicle having a plurality of wheels, the method further comprising the step of lifting the body until all of the plurality of wheels are free of ground support, the method being applied to each of the plurality of wheels.

16. The method of claim 13 for a vehicle having a plurality of wheels, wherein the predetermined relative state of the body and wheel comprises the plurality of wheels providing sole support for the body.

17. The method of claim 13 wherein the step of generating the electronic control signal includes providing a scaled reduction in the increase of damping as the damper position signal moves away from the predetermined one of the compression and rebound limit positions.

18. The method of claim 13 wherein the trimset value is derived at least partly in response to a stored value indicating accumulated vehicle mileage.

19. The method of claim 13 wherein the trimset value is derived at least partly in response to a stored value indicating vehicle age.

* * * * *